United States Patent [19]

Seaton et al.

[11] 4,325,078

[45] Apr. 13, 1982

[54] PAY PER VIEW TELEVISION CONTROL DEVICE

[75] Inventors: John C. Seaton, Norwalk, Conn.; Leonard Cohen, Pearl River, N.Y.

[73] Assignee: The TeleMine Company, Inc., New York, N.Y.

[21] Appl. No.: 95,973

[22] Filed: Nov. 20, 1979

Related U.S. Application Data

[63] Continuation of Ser. No. 969,458, Dec. 14, 1978, abandoned.

[51] Int. Cl.³ .............................................. H04N 7/16
[52] U.S. Cl. .................................... 358/117; 358/84; 358/115
[58] Field of Search ......................... 358/84, 115, 117; 455/171

[56] References Cited

U.S. PATENT DOCUMENTS

| | | | |
|---|---|---|---|
| 3,531,582 | 9/1970 | Walker | 358/115 |
| 3,890,461 | 6/1975 | Vogelman et al. | 358/115 |
| 4,012,583 | 3/1977 | Kramer | 358/115 |
| 4,058,830 | 11/1977 | Guinet et al. | 358/115 |
| 4,081,832 | 3/1978 | Sherman | 358/124 |
| 4,130,833 | 12/1978 | Chomet | 358/115 |

Primary Examiner—S. C. Buczinski
Attorney, Agent, or Firm—J. David Dainow

[57] ABSTRACT

An apparatus and method for providing limited access to broadcast television programming in a CATV System wherein each television subscriber is provided with a converter for converting broadcast television signals into signals suitable for reception and display by a conventional television receiver and means for disabling the converter from producing TV compatible signals selectively activated by a switching device. A magnetic card reader reads the data on a program card inserted by the subscriber and compares it with a reference data record stored in a memory to determine if the program card is valid for the program sought to be viewed. If the card is valid a timer is actuated to cause the switching device to enable reception of the broadcast program while obliterating the data on the program card so that the card cannot be reused. The reference data record may be variable with time so that a program card will only be effective for enabling program viewing during a predetermined time period.

7 Claims, 2 Drawing Figures

PAY PER VIEW TELEVISION CONTROL DEVICE

This is a continuation, of application Ser. No. 969,458, filed Dec. 14, 1978, now abandoned.

BACKGROUND OF THE INVENTION

Community Antenna Television (CATV) Systems enable subscribers to receive an enhanced signal carrying television programs broadcasted on standard television channels, typically over cables connected to viewers receivers, for improved program reception. As an adjunct to the broadcast of publicly available programming, CATV operators have offered pay TV services wherein subscribers are supplied with additional channels of TV programming, not publicly available, in return for payment of a periodic (usually monthly) fee. Still another type of CATV service offers subscribers special program broadcasts such as first run movies or live theater plays and shows on a one time basis for payment of a single fee.

In order to provide one time viewing services, it is necessary to be able to selectively enable and disable the apparatus which provides to each subscriber's television receiver a signal suitable for viewing. As this cannot be feasibly done by having a technician from the CATV operator visit the subscriber's home before and after each program is viewed to perform the enabling and disabling operations, since it would be extremely costly, other methods of restricting access to TV programs are necessary. One approach to overcoming the need to send a technician to a subscriber's home is to enable and disable the subscriber's access to programming by remote control through the transmission of enabling and disabling signals to each subscriber's residence by complex transmitters and receivers and intermediary connecting lines. The apparatus required to accomplish remote control is complex and expensive and can only be feasibly used where there are a large number of subscribers among whom the costs of the equipment can be amortized over a period of time. The initial start-up costs for assembling such a system and the uncertainty of the number of subscribers who can be expected to participate has discouraged smaller CATV operators from providing single program viewing services.

It is also known that a magnetically encoded ticket or record means can be used to actuate a switching device for energizing an electrical mechanism such as an electrically operated gate for permitting access to a building or a depository in a bank. Such tickets, however, do not lend themselves to use for limited subscription television viewing since they can be re-used indefinitely and, hence, once supplied to a subscriber provide no way of limiting the time during which TV access permitted by the ticket or record means can be obtained.

SUMMARY OF THE INVENTION

The invention disclosed herein features a method and an apparatus for overcoming the above stated problems and permitting access to particular television programs to be provided to subscribers on a one time, single payment basis by means of a ticket or record medium which is provided to the subscriber in return for a payment, preferably in advance, and which cannot be repeatedly used so that the subscriber must purchase a new ticket or record medium for each new program desired to be viewed. Specifically, the invention provides for an apparatus which is installed at each subscriber's television receiver and includes a reader for receiving the ticket or record medium on which magnetic data is pre-recorded by the CATV System operator in accordance with the nature of viewing to be provided to the subscriber, a reference signal generator, a comparator for comparing the output of the reference signal generator with the output of the data reader in response to the insertion of the ticket or record medium into the reader, the comparator having an output indicative of whether or not the data on the ticket or the record medium corresponds to the reference data represented by the output of the reference signal generator, a timer which is actuated for a limited time period in response to a correspondence between the data on the ticket or record medium and that represented by the output of the signal generator and a switching device actuable for a time determined by the timer for enabling reception of a desired program by a subscriber's television receiver for a predetermined time period.

It is therefore an object of the invention to provide an apparatus and method for enabling viewing of television programs for a single predetermined period of time.

Another object of the invention is to provide an apparatus and method for enabling single program viewing which can be used in conjunction with a ticket or record medium which can be mailed or otherwise delivered to a subscriber from a remote location.

Still another object of the invention is to provide an apparatus and method for enabling limited viewing of television programs in conjunction with the use of a ticket or record medium which can only be used once.

A further object of the invention is to provide an apparatus and method for controlling access to TV programs which does not require the remote transmission of signals to a subscriber's residence.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
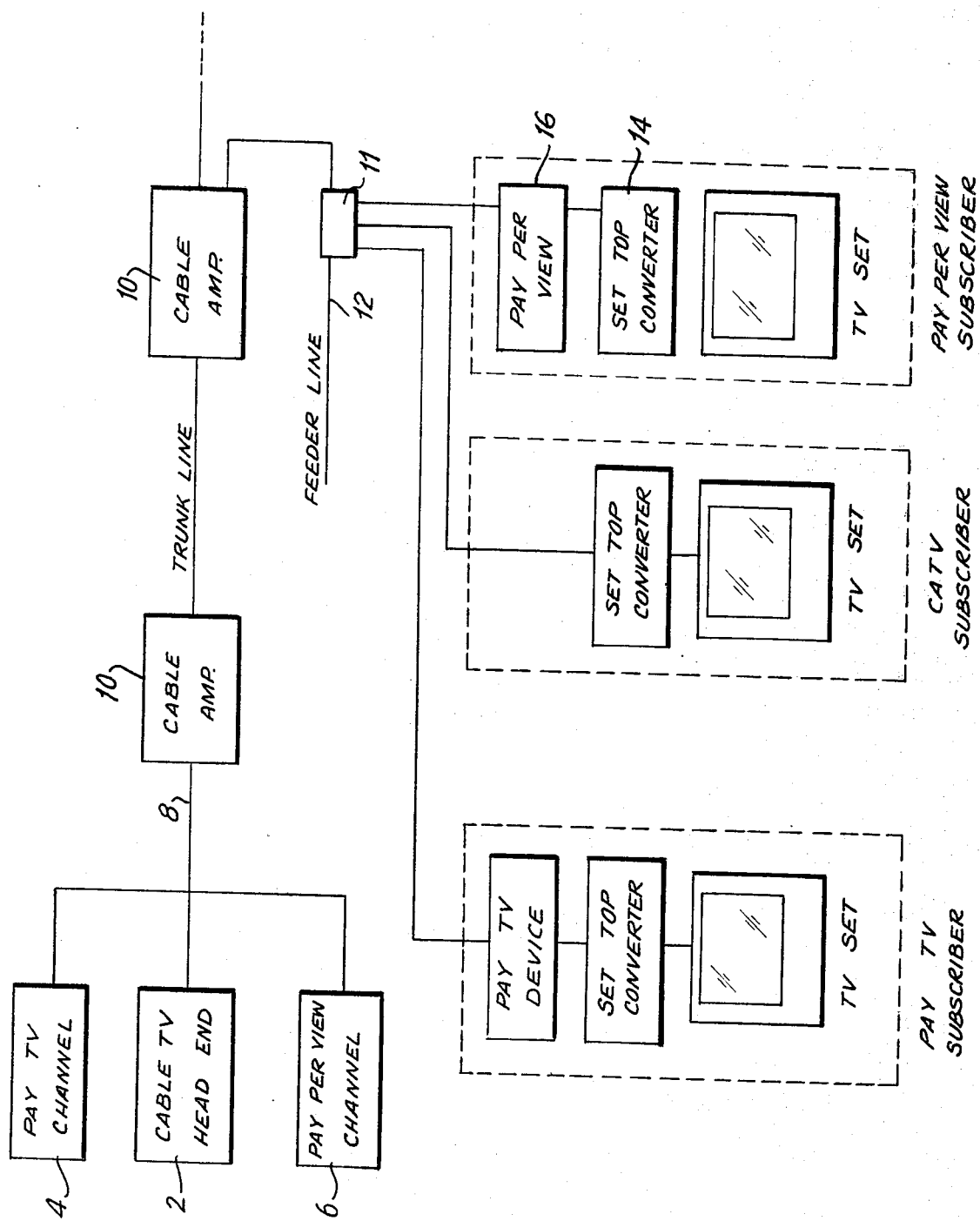
FIG. 1 is a block diagram showing the apparatus of the invention in relation to its intended environment.

Referring now to FIG. 1 of the drawings, there is shown a cable television system which offers enhanced reception of transmissions over standard television channels from a head end 2 to a television receiver as well as one or more additional channels of regular programming via a facility 4, which is paid for on a periodic basis and which can be termed "pay TV" and also offers special single program service from a facility 6 which is paid for on a per use basis. It is the one time use, single payment service with which the present invention is primarily concerned although it can have application with other services. A trunk line 8 has serial amplifiers 10 interspersed along its length to compensate for the inherent attenuation of the broadcast signals on the trunk line 8. Taps 11 for serving a group of neighboring television program subscribers are connected to the amplifiers 10 along the trunk line 8 and to respective feeder line 12 which supply power to the amplifiers as well as to the components of the system located at the subscriber's residences.

Connected to the television receiver of each subscriber, at his residence, is a frequency converter 14 adapted to convert the incoming signals from the head end to a frequency compatible with one of the frequencies to which the receiver can be tuned. A switching device is also provided which can interrupt the transmissions from the head end to the converter or television receiver or which can selectively pass or interrupt a jamming signal transmitted from the head end for jamming the reception of subscribers on channels for which no subscription has been taken.

In accordance with the apparatus of the present invention a console 16 is provided proximate to the television receiver for housing the switching device as well as a means for receiving and processing a subscription ticket or record medium to control the switching device as will subsequently be described in connection with FIG. 2 of the drawings.

Figure 2:
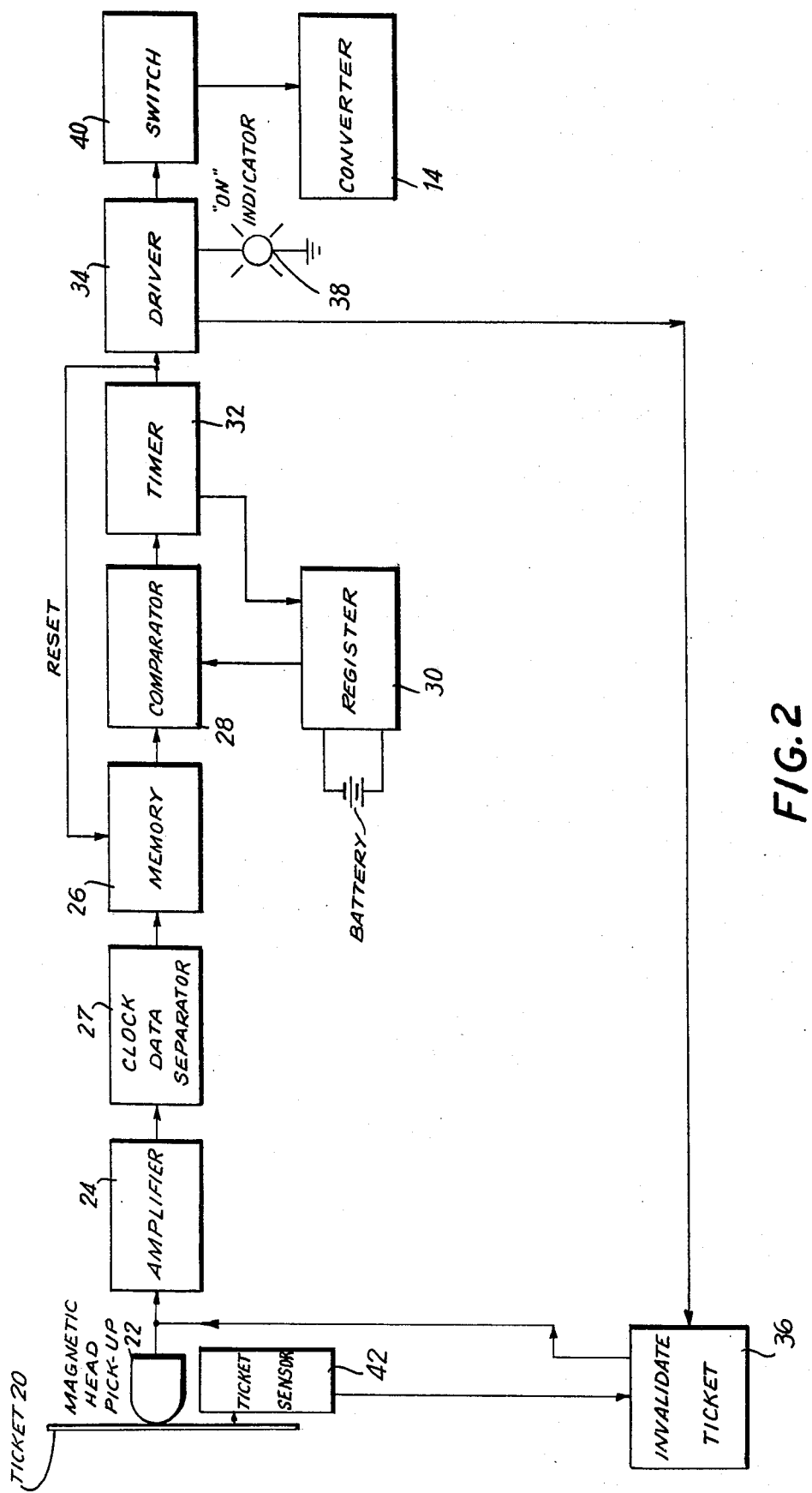
FIG. 2 is a functional block diagram showing the interrelation of, and flow of signals between, the components of the preferred embodiment of the invention.

Referring now to FIG. 2 of the drawings there is shown a functional block diagram of the console 16 which is used to selectively enable and disable viewing, by a subscriber, of a single television program or group of consecutively broadcast programs. The console has an opening through which a ticket 20 provided by the cable system operator can be inserted and brought into registration with a magnetic pick-up head 22. The ticket 20 has a portion of its surface covered with a magnetic stripe, the ticket with magnetic stripe serving as a record means for magnetically recorded data. The data which is applied to the card by the cable operator is translatable into a digital code which can contain various information including the month, day and year on which the ticket is to expire and thereafter no longer be effective to enable television reception, an identifier for the subscriber to prevent use of the ticket by other subscribers, an amount of time for which programming reception is to be enabled and thereafter disabled and a validity indicator which indicates that the card has not been previously used and is effective when used by a proper subscriber on an appropriate date or at a appropriate time to enable viewing of a limited audience broadcast.

The coded data on the magnetic stripe of the ticket is converted by the magnetic pick-up head 22 into a series of signals which are amplified in an amplifier 24 and stored in a memory 26 by means of a clock data separater 27. The memory 26 may include a digital register capable of storing data in binary form and having a reset input for clearing the memory in response to an appropriate electrical signal applied at the reset input.

The contents of the memory 26 indicative of the validity of the ticket, the identity of the subscriber, and/or the expiration date of the ticket are applied to one input of a comparator 28. The output of a digital register 30 which serves as a reference signal generator is applied to a second input of the comparator 28. The output of the comparator 28 is normally low but goes high upon the occurrence of a match between the digital data stored in the memory 26 and the reference data stored in the register 30. Upon the occurrence of a high signal at the output of the comparator 28 indicative of the validity of the ticket, the proper identity of the subscriber and the fact that the ticket has not yet expired, a timer 32 is actuated.

The timer 32 can include a digital counter which is incremented in response to oscillator derived pulses (as for example from a quartz crystal oscillator and frequency step-down counters). For fixed viewing time applications, the timer 32 can internally reset itself, i.e. go from a high output to a low output after a predetermined count is reached at which time the count resets to zero and the memory 26 is cleared to enable new data to be received and to restore the output of the comparator 28 to a low state. For variable time applications whereby the viewing time is encoded with the other input data on the card 20, the instantaneous count in the timer 32 can be stored in the register 30 and compared with the viewing time data from the card 20 which is stored in the memory 26. In this way, a subscriber can purchase variable amounts of TV viewing time.

The output of the timer 32 is normally low but goes high from the time the timer 32 is actuated by the application of a high signal at its input and remains high until the end of the predetermined time period whether it be preset by programming the timer during installation of the console 16 or programmed by the data contained on the ticket 20. Once the programmed on-time, which may be designated by a count to which the digital counter in the timer must count, expires, the output of the timer 32 goes low again.

The register 30 can also include a battery powered clock having an output indicative of the current date and, if desired, the time of day which can be part of the reference data record. The register 30 can also have an input connected to the output of the memory 26 for storing a "viewing time" encoded on the input data card 20. The comparator 28 can then be utilized to compare the elapsed time during a timing cycle with a programmed "maximum viewing time" and when the elapsed time as determined by a digital counter in the timer equals or exceeds the viewing time the timer output signal can be caused to go low in response to the output of the comparator 28.

The output of the timer 32 is connected to a driver circuit 34 which can include one or more amplifiers for actuating a ticket invalidate signal generator 36, a TV reception enable indication signal lamp 38 and a microwave switch 40. The invalidating signal generator 36 can be operatively connected to the oscillator which generates the circuit timing signals. The output of the invalidate signal generator 36 is applied to a magnetic field generating head proximate to the magnetic stripe on the ticket 20 and can be applied directly to the magnetic pick-up head 22 where the head is suitable for handling the necessary power for "erasing" the data stored on the magnetic stripe. The invalidate generator 36 is actuated only upon the successful reading of the correct information from the ticket 20. That is, only when there is a match between the data stored on the magnetic stripe of the ticket 20 and the data stored in the reference register 30, as indicated by a high output from the comparator 28, is a ticket invalidated. Hence if a ticket fails to enable television viewing, it is not erased and the reason for its failure to enable can be determined as for example if tickets intended for different subscribers or different times are interchanged.

A sensor 42 located adjacent the opening in the console 16 for receiving the ticket 20 senses the presence of the ticket 20 in its position for reading by the magnetic pick-up 22 and erasing or obliterating of the data by the magnetic pick-up head or an adjacently located magnetic field emitting head. The invalidate signal generator 36 is activated upon the successful reading of valid information from the ticket 20 to produce at its output either a direct current magnetic field or a continuous high or logic "1" pulse train. The ticket sensor 42 has an output which is connected to an input of the invalidate signal generator 36 for permitting generation of invalidating signals from the generator 36 only in response to a ticket being placed in the console 16. An output signal from the driver 34 disables the invalidate signal generator during a program viewing cycle. Hence if a valid ticket is inadvertently inserted into the console 16 while program viewing is enabled, as a result of a previous insertion of a valid ticket, the second ticket to be inserted will not be invalidated.

Another output of the driver 34 is connected to an indicator lamp 38 which is lit while the timer is in an actuated state to indicate to a subscriber or television user that the system is in a state suitable to enable reception of special programming. A third output of the driver 34 is connected to the input of the microwave switch 40. The switch 40 is a high frequency relay circuit which can complete or interrupt the microwave circuit between the cable system and the frequency converter or decoder 14. The switch 40 may also be disposed between the converter and the television receiver. The switch 40 may be employed to open the circuit to which the television programming signal is conducted, or to short circuit the converter by providing a path around it which is closed when reception is to be disabled and open when it is to be enabled, or by selectively permitting and preventing a jamming signal supplied by a local generator or from the head end to be applied to the input of the converter 14.

It is to be understood that the components represented by each of the blocks in FIG. 2 comprise standard devices known to the prior art and available from manufacturers as will be known to those skilled in the arts of digital and high frequency circuits The invention which resides in a novel arrangement of known elements for cooperation in performing the function of allowing television subscribers to "purchase time" during which specialized television program viewing can be enabled has been illustrated in a preferred embodiment but it is to be appreciated that alterations to and variations of the preferred embodiment herein disclosed can be made without departing from the spirit and scope of the invention.

We claim:

1. Apparatus for providing limited access to television programs comprising
    a reader having an input for receiving a record medium on which there is recorded data including representations of a pre-determined period of time for said access and an output at which there are generated electrical signals corresponding to the data recorded on said medium,
    a reference signal generator having an output at which there are generated pre-determined electrical signals corresponding to a reference data record, said reference signal generator including timing means for continuously generating signals indicative of elapsed time from a pre-determined reference time, said output comprising said elapsed time signals,
    a comparator for comparing the output signals of said reader with the output signals of said signal generator and having an output at which there is generated a validity signal indicative of a correspondence between said reader and reference signal generator output signals, and
    a switching device having an "On" state and an "Off" state and being responsive to said comparator for being in said "On" state only during the occurrence of said validity signal, said switch means enabling access to said television programs when in said "On" state and preventing access when in said "Off" state.

2. Apparatus according to claim 1 further comprising means responsive to said validity signal for altering the data on said record medium when actuated.

3. Apparatus according to claim 2 wherein said record medium comprises a magnetizable surface and said reader comprises a magnetic head.

4. Apparatus according to claim 3 wherein said altering means comprises means for generating a magnetic field in the vicinity of said reader.

5. Apparatus according to claim 4 further comprising a sensor for sensing the presence of said record medium at the input of said reader, said altering means being responsive to said sensor for being actuable only when said record means is received at the input of said reader.

6. Apparatus according to any of claims 1 through 5 wherein said reference record includes a clock means for generating output signals indicative of current time so that access to a television program can be enabled only during a time period limited by the data on said record medium.

7. A method of obtaining access to a television program and comprising:
    applying a record medium containing data including a representation of a pre-determined period of time for said access stored thereon to the input of a data reader,
    comparing signals representative of said record medium data with reference signals including signals indicative of elapsed time from a pre-determined reference time,
    enabling access to the television program only in response to a pre-determined correspondence between said record medium data representative signals and said reference signals, and
    causing said data record to be altered after said data is read thereby preventing said record means from again being used to provide access to a program before enabling data is again recorded thereon.

* * * * *

UNITED STATES PATENT AND TRADEMARK OFFICE
CERTIFICATE OF CORRECTION

PATENT NO. : 4,325,078
DATED : April 13, 1982
INVENTOR(S) : SEATON, ET AL

It is certified that error appears in the above—identified patent and that said Letters Patent is hereby corrected as shown below:

Column 6, line 35, omit "record" and insert --signal generator--.

Signed and Sealed this

Sixteenth Day of November 1982

[SEAL]

Attest:

GERALD J. MOSSINGHOFF

Attesting Officer      Commissioner of Patents and Trademarks